United States Patent [19]
Finotello et al.

[11] Patent Number: 5,903,310
[45] Date of Patent: May 11, 1999

[54] DEVICE FOR MANIPULATING COMPRESSED VIDEO SEQUENCES

[75] Inventors: Andrea Finotello, Settimo Torinese; Marco Gandini, Turin; Pierangelo Garino, Volpiano; Mauro Marchisio, Turin, all of Italy

[73] Assignee: CSELT-Centro Studi E Laboratori Telecomunicazioni S.p.A., Turin, Italy

[21] Appl. No.: 08/780,169

[22] Filed: Dec. 26, 1996

[30] Foreign Application Priority Data

Feb. 27, 1996 [IT] Italy .................................. T096A0123

[51] Int. Cl.$^6$ ...................................... H04N 7/12
[52] U.S. Cl. ........................... 348/391; 348/567; 348/584
[58] Field of Search ..................... 348/391, 392, 348/393, 415, 416, 409, 584, 585, 567, 444, 450; H04N 7/12

[56] References Cited

U.S. PATENT DOCUMENTS

| | | | |
|---|---|---|---|
| 5,182,642 | 1/1993 | Gersdoff et al. ...................... | 358/133 |
| 5,359,694 | 10/1994 | Concordel . | |
| 5,583,794 | 12/1996 | Shimizu ................................ | 364/514 |
| 5,619,597 | 4/1997 | Moreton ................................ | 382/296 |
| 5,623,311 | 4/1997 | Phillips et al. ......................... | 348/396 |
| 5,638,128 | 6/1997 | Hoogenboom et al. ............... | 348/416 |
| 5,703,651 | 12/1997 | Kim et al. .............................. | 348/416 |
| 5,739,868 | 4/1998 | Bulter .................................... | 348/584 |
| 5,768,445 | 6/1998 | Troeller et al. ........................ | 382/305 |
| 5,778,100 | 7/1998 | Chen et al. ............................ | 382/243 |

OTHER PUBLICATIONS

Onoye et al: Single Chip Implementation of MPEG2 Decoder for HDTV Level Pictures, IECI Transactions on Fundamentals of Electronics, Comm.And Computer Sciences, vol. E79–A, No. 3, Mar. 1, 1996, pp. 330–338.

Winzker et al "Architecture and Memory Requirements for Stand–Alone and Hierarchical MPEG2 HDTV–Decoders with Synchronous DRAMS", vol. 1, Apr. 30, 1995.

*Primary Examiner*—Bryan Tung
*Assistant Examiner*—Tung Vo
*Attorney, Agent, or Firm*—Herbert Dubno

[57] ABSTRACT

An integrated circuit for manipulating digitized video sequences is provided, for use in a system for transmission and reception of compressed video sequences to perform, possibly with the aid of an external memory, reordering, format conversion, prediction and motion compensation on the pictures in a sequence. The device has memory for temporarily storing sequences to be manipulated and data read from the external memory; a circuit for decoding information about the manipulations to be performed; address circuitry for transferring the data between the device and the external memory; circuitry for configuring the device by means of a remote processing unit; circuitry for processing the data read from the external memory; and circuitry for arranging the output sequences in the format required by the function to be performed. A controller may control, supervise and set up the functions to be performed.

8 Claims, 10 Drawing Sheets

DEVICE FOR MANIPULATING COMPRESSED VIDEO SEQUENCES

FIELD OF THE INVENTION

The invention described herein relates to processing systems for digitized video signals and, in particular, to a multi-function device for manipulating compressed video sequences, to be used as an aid in encoding and decoding those sequences. Hereinafter, reference will be made, by way of non-limiting example, to sequences arranged in accordance with international standard ISO/IEC 13818-2 (also known as ISO/MPEG2), but the invention can be applied to sequences encoded and decoded according to principles similar to those disclosed in the standard. For the sake of simplicity, those sequences shall hereinafter be referred to as MPEG2 video sequences or data.

BACKGROUND OF THE INVENTION

As is well known, the standard specifies the encoded (or compressed) representation of video sequences for digital storage and digital video communications and defines the decoding process. The encoding process is not defined in the standard, and it is essentially a hybrid coding, using time prediction techniques with motion estimation (at the pixel block level) to reduce time redundancy, and two-dimensional transform techniques applied to a current picture or to the significant differences between the current picture and a predicted picture to reduce spatial redundancy. Information on the encoding procedures (e.g. with or without prediction and/or motion compensation), motion information and spatial information are then transmitted after encoding with a variable length code. Decoding entails processing the compressed sequences in successive steps, until the original picture sequence is recovered for its subsequent display. In particular, after decoding the variable length code and re-ordering the transmitted coefficients, the latter are subjected to inverse quantization, and spatial and time redundancies are re-introduced. Greater detail can be found in the standard mentioned above as well as in standard ISO/IEC 11172-2 (ISO/MPEG1) and in the paper "The MPEG video compression algorithm", by D. J. Le Gall, Signal Processing: Picture Communication, Vol. 4, No. 2, pp. 129 et seq.

Several devices for encoding and/or decoding MPEG2 video sequences are commercially available. These devices perform all of the functions of an encoder or decoder in accordance with the standard. In general, however, such devices are not meant for professional use (i.e. for use by a television broadcaster or by producers of video disks or compact disks) but rather for "home" users: hence, they only allow pre-set and limited variations of the encoding parameters, and the quality of the encoded or decoded signals they provide is sufficient only if the signals have not been subjected to particular manipulations (e.g. a succession of encoding and decoding operations, as may occur in a television transmission). In general, it is not possible to manipulate these parameters through a control processing unit. To obtain the high encoding quality required for professional use, the possibility of acting on several encoding and decoding parameters at different stages of their respective processes must be provided for this entails the introduction of arrays of discrete components in the different parts of the equipment, which results in larger equipment size and higher costs.

OBJECT OF THE INVENTION

It is an object of the invention to provide a device which can be used to accomplish several of the operations required of a professional quality MPEG2 video transmitter or receiver, thereby contributing to reducing its size and offering remarkable performance in terms of function and speed.

SUMMARY OF THE INVENTION

The device according to the invention comprises, in a single integrated circuit:
  a first memory system for temporarily storing and formatting the sequences to be manipulated, before forwarding them to an external memory or to the output of the device;
  a second memory system, for temporarily storing and formatting sequences read from the external memory, before forwarding them to the output of the device;
  addressing means for writing sequences into the external memory or reading sequences from the external memory;
  means for processing data read from the external memory;
  means for receiving, decoding and sending to the other units of the device parameters containing information about the manipulations to be performed on the sequences received or on the sequences to be transmitted;
  means for organizing the data to be emitted into a format required by a particular function to be performed; and
  means for configuring the device in order to make it operate in one of a plurality of modes, each corresponding to a different function.

According to a preferred embodiment of the invention, the configuration means make the device operate so as to allow its use, in a transmission and reception system, as:
  device for re-ordering sequences from an acquisition order to an encoding order at the transmission side or, conversely from an encoding order to a display order at the reception side, by using the external memory, such re-ordering requiring a conversion from a raster scan format to a macro-block scan format or the reverse, and possibly a conversion between two different raster scan formats;
  a device for scan format conversion from a macro-block scan format to a block scan format or vice versa, upstream of circuits computing a two-dimensional transform or downstream of circuits computing an inverse transform, such conversion using the first memory system alone; and
  prediction device for generating predicted pictures, possibly with motion compensation, starting from one or more reference pictures stored in the external memory, such generation requiring extracting, from the external memory, macro-blocks to which motion vectors may be applied, with regard to both luminance pixels and chrominance pixels, or extracting sets of luminance or chrominance pixels of pre-defined size, larger than that of a macro-block.

BRIEF DESCRIPTION OF THE DRAWING

The above and other objects, features, and advantages will become more readily apparent from the following description, reference being made to the accompanying drawing in which:

FIGS. 6A–9 are more detailed diagrams of some blocks shown in FIG. 5; and

SPECIFIC DESCRIPTION

Before describing the Figures in detail, it is worthwhile to recall some definitions concerning the hierarchical arrangement within a digitized picture and the encoding modes at the picture level. Both luminance and chrominance samples (pixels) are grouped into blocks each in an 8×8 matrix (8 rows of 8 pixels each), and a certain number of luminance and chrominance blocks (e.g. 4 blocks of luminance data and 2 corresponding blocks of chrominance data) form a macro-block. The picture is then formed by a matrix of 36×45 or 30×45 macro-blocks (depending on whether the power supply frequency is 50 or 60 Hz). Pictures can in turn have a frame structure (in which pixels of subsequent rows pertain to different fields) or a field structure (in which all pixels pertain to the same field). As a consequence, macro-blocks may have a frame or field structure, as well.

With regard to encoding modes, the following types of encoded pictures can be recognized:

pictures subjected to intra-picture encoding (I pictures), i.e. pictures encoded using only information contained within them;

pictures encoded with prediction (P pictures), i.e. pictures for which the difference between the current picture and a picture obtained by means of a prediction with motion compensation starting from one or more past reference pictures is encoded; and pictures encoded with bi-directional prediction (B pictures), i.e. pictures encoded by using a prediction with motion compensation starting from past and/or future reference pictures.

A reference picture is a reconstructed (decoded) picture, which had been encoded as an I or a P picture.

This stated, the transmitter (FIG. 1) receives from a source, not represented here, digital samples arranged according to the hierarchical structure described above, present on a line 1. The succession of samples is fed to a motion estimation unit SM which determines the type of encoding for the current picture and computes and emits, if necessary, one or more motion vectors representing the displacement between the position of a macro-block in the current picture and its position in the reference picture or pictures. Then, a sequence re-ordering unit RS converts the order of the pictures from the one in which the pictures are emitted by the source (acquisition and display order) into an order (encoding order) suitable for the encoding type (in particular, an order allowing to decode the reference pictures before the predicted pictures). The re-ordered sequence is fed to the actual encoding (or compression) units, indicated in the whole by COD. At the input of COD, a subtractor ST subtracts, in case of P and B pictures, the reference picture or pictures (predicted and stored in a circuit P1) from the current picture and feeds the difference to a circuit CS for scan conversion from the macro-block format to the block format, as required to compute the two-dimensional transform. References T, Q indicate the circuits for computing the transform (in particular, a discrete-cosine transform) and quantizing the transform coefficients. The coefficients to be used are fed on one hand to the local decoder for reconstructing the reference picture or pictures, and on the other hand to an encoder CV which encodes them according to a variable length code. CV sends the encoded coefficients, through a line 2, to a receiver or to a memory device together with the motion vector or vectors and with information on the encoding type. The local decoder comprises an inverse quantizer 1Q1, a circuit IT1 for computing the inverse transform and a circuit ICS1 for reconverting the scan format from the block format to the macro-block format. The output signal from ICS1 is added in an adder SM1 with the predicted reference picture, stored in P1 and suitably delayed in a delay element RIT1. The result is fed to P1 for the new prediction.

Figure 1:
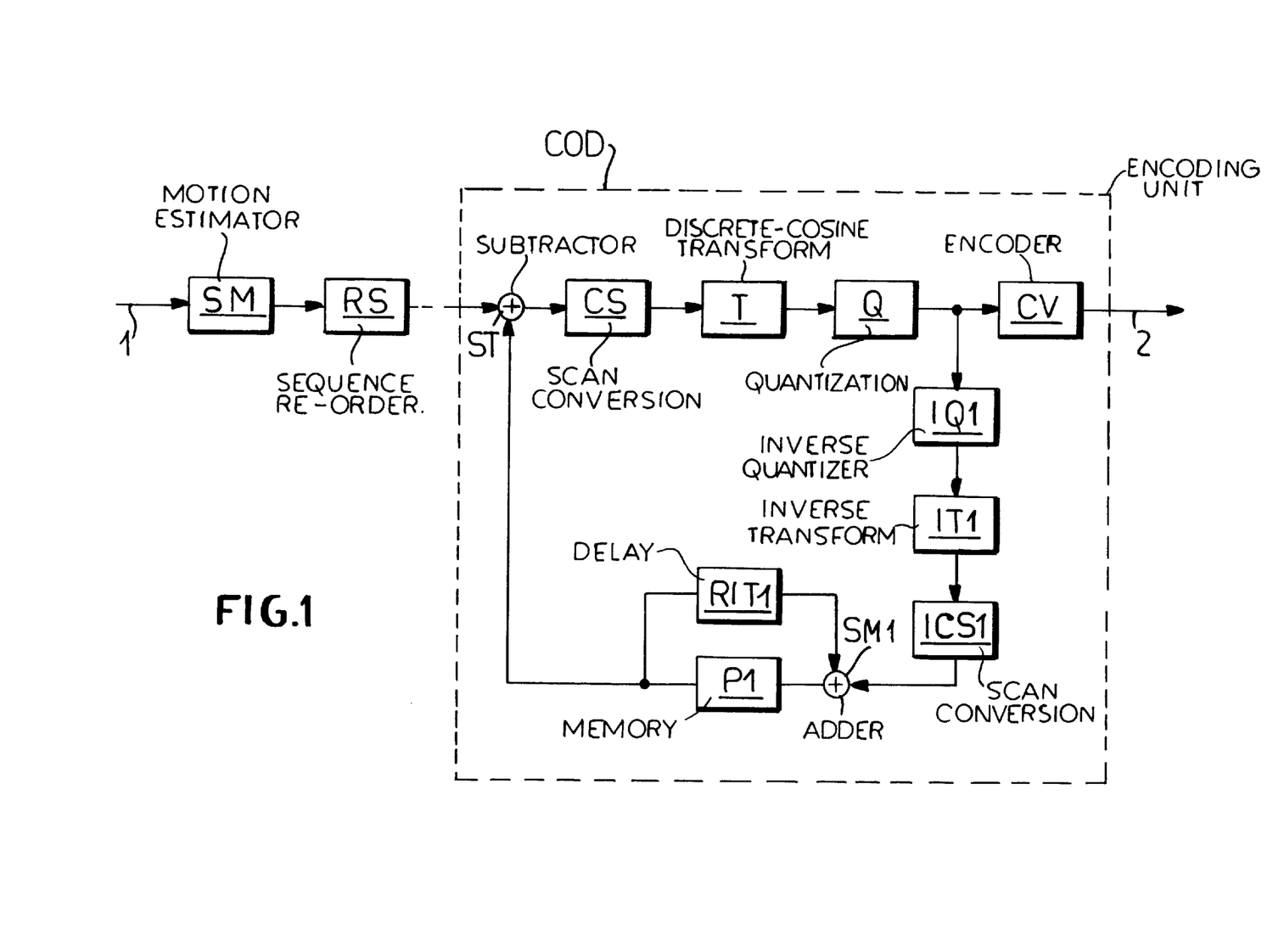
FIG. 1 is a simplified functional diagram of an MPEG-2 video sequence transmitter.

For the sake of simplicity, the drawing does not show the means which combine the quantized and encoded coefficients of the transform with the information emitted by motion estimator SM and which arrange the bit stream of the encoded signal according to the syntax established by the standard. The detailed description of that syntax is immaterial for the purposes of the present invention.

Figure 2:
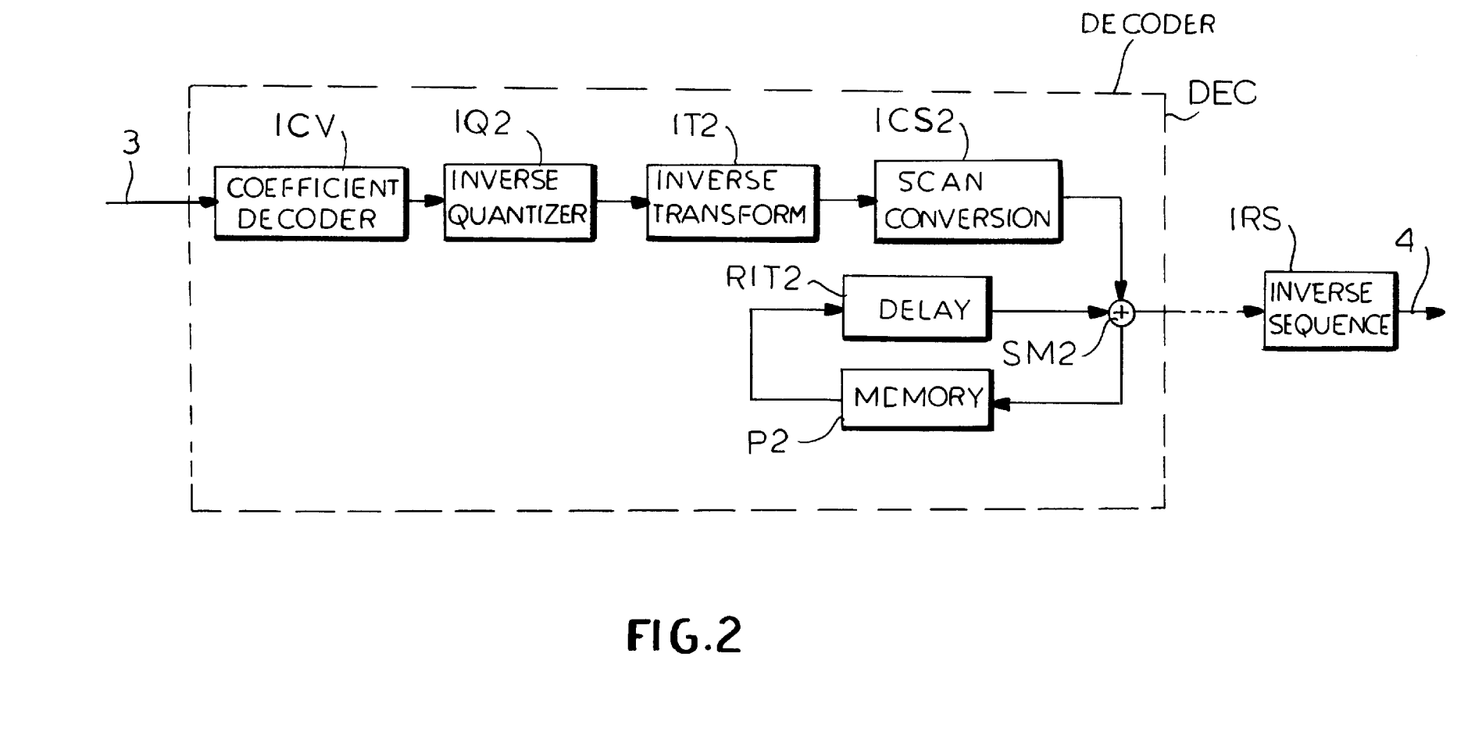
FIG. 2 is a simplified functional diagram of the receiver.

In FIG. 2 the receiver comprises, downstream of the units (not represented) which extract the different kinds of information from the bit stream present on a line 3, decoder DEC in turn comprising circuit ICV for decoding the coefficients encoded according to the variable length code, and circuits IQ2, 1T2, ICS2, SM2, P2, RIT2, similar to circuits IQ1, IT1, ICS1, SM1, P1, RIT1 shown in FIG. 1. The reconstructed pictures, in the encoding order, are present at the output from SM2 and are then fed to circuit IRS which performs the inverse operation with respect to RS (FIG. 1) re-establishing the display order before forwarding the pictures to utilization devices through a line 4.

Blocks RS, IRS and P1, P2 also incorporate the external memories needed for the blocks themselves to operate. Note also that FIGS. 1 and 2 depict solely the data flow.

The device according to the invention can be used to build each one of the blocks RS, CS, ICS1, P1 in FIG. 1 and blocks ICS2, P2, IRS in FIG. 2. Hence, it can perform the following main functions:

1) Reordering picture sequences from the acquisition order to the encoding order and vice versa. This operation entails converting picture format from a "raster scan" format to a format known as Progressive Macro-Block Scan (PMBS) format: the latter term means that, for luminance, the 16 pixels of a row of the macro-block are read before moving on to the next row, whereas, for chrominance, pixel pairs Cb, Cr are read in sequence. For the sake of simplicity, hereafter, the term "progressive macro-block" or just "macro-block" shall be used to indicate that format. Re-ordering can be performed simultaneously with conversion, or it can occur upstream (in RS) or downstream (in IRS) of the conversion. Operations connected with that re-ordering process shall hereafter be called "raster reading (writing)" and "macro-block writing (reading)";

2) Conversion from macro-block format to block format, with interlaced block scan (IBS) or progressive block scan (PBS) and vice versa. Hereafter, for the sake of simplicity, the terms "interlaced block" or "progressive block" shall be used. The two yes of block are possible only for luminance and for a "frame" macro-block; in case of field macro-block, only conversion to progressive block is possible. Conversion to progressive block requires reading in sequence the first 8 pixels of all rows of the macro-blocks, whereas in case of interlaced block, 8 pixels of alternating rows will be read, since, as is well known, subsequent rows in the macro-block pertain to different fields. For chrominance, reading involves first the Cb pixel block and then the Cr pixel block;

3) Extraction of a prediction macro-block from a reference picture (or from two reference pictures, in case of bi-directional compensation), i.e. application of the motion vectors to the pixels of a macro-block stored in the external memory to obtain a predicted macro-block. This function can be performed along with an interpolation with half-pixel resolution. For the sake of brevity, that function shall be called "macro-block extraction": note that macro-block reading can be seen as an extraction in which null vectors are applied, but the term "extraction" shall hereafter be used only for the case of non-null motion vectors.

An additional function, similar to the previous one, is the extraction of a so-called "zone" from a reference picture stored in the external memory. The term "zone" indicates a set of data with pre-defined size, larger than the macro-block size. This function can be used to process and refine the prediction macro-block, before it is used. The size of the zone depend on the video signal type (progressive or interlaced) and it may be, for example, 22×18 (i.e. 18 rows of 22 pixels each) or 28×14 for luminance, and 22×9 or 28×7 for chrominance. In case of zone extraction, pixels of two different zones will actually be extracted.

Figure 3:
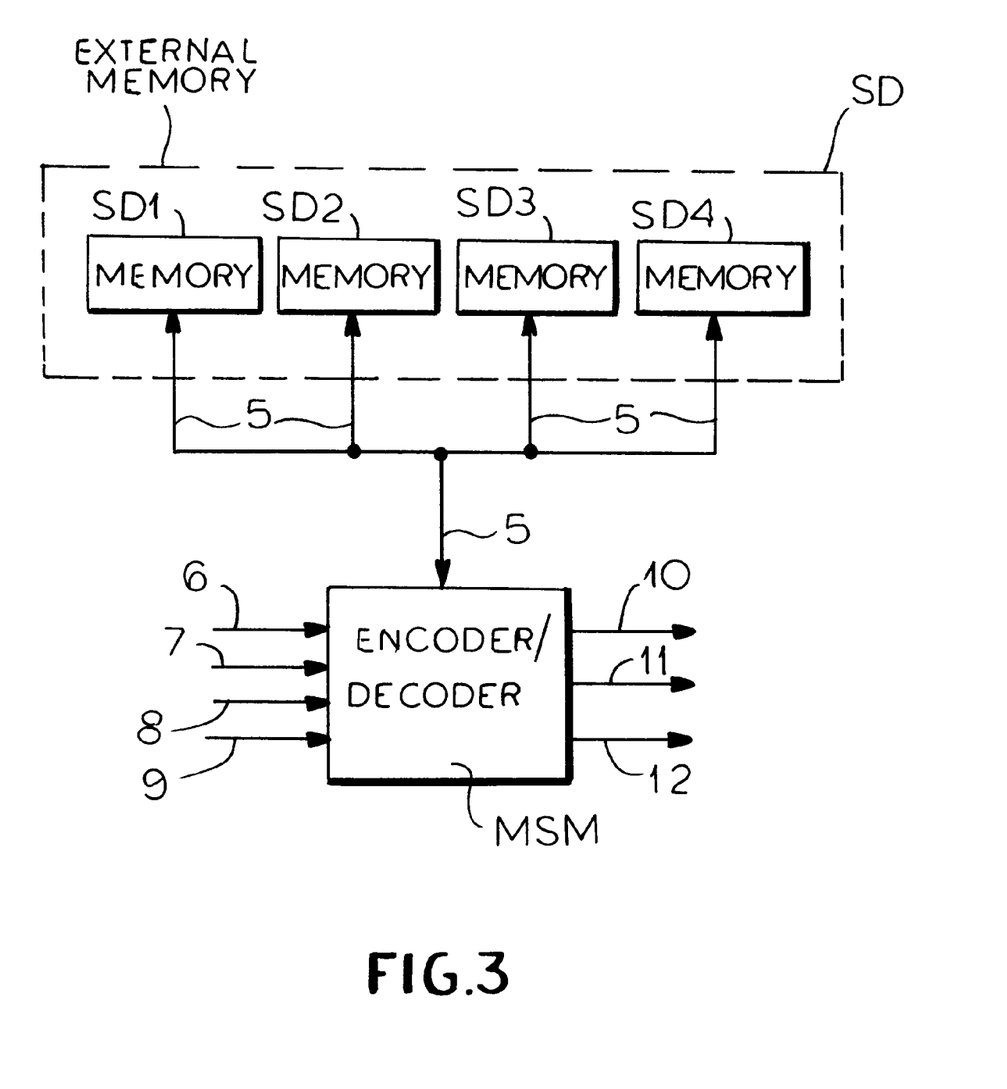
FIG. 3 is a diagram depicting the inputs, the outputs and the connections to the external memory of the device according to the invention.

FIG. 3 depicts the inputs and outputs of the circuit according to the invention, indicated as MSM. The circuit, as previously stated, can be associated with an external memory SD which, advantageously, comprises SDRAM (Synchronous Dynamic RAM) elements. In the preferred embodiment of the invention, MSM can co-operate with up to 4 elements, indicated in the Figure as SD1 . . . SD4. By way of example, it is assumed that the elements can store three pictures each. If SD comprises multiple elements, these are written and read by MSM one at a time. Line 5 is a schematic representation of the set of connections between MSM and SD for data exchange and command transmission.

Figure 4A:
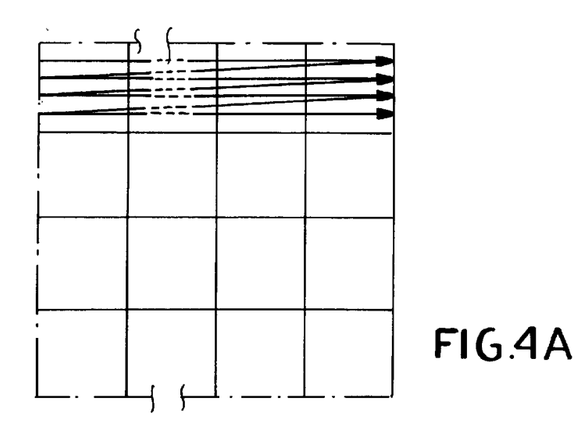
FIGS. 4A–4D are diagrams showing pixel arrangement in the external memory.
Figure 4B:
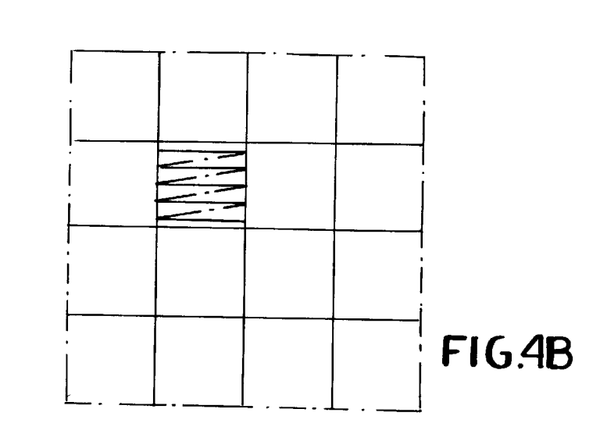
Figure 4C:
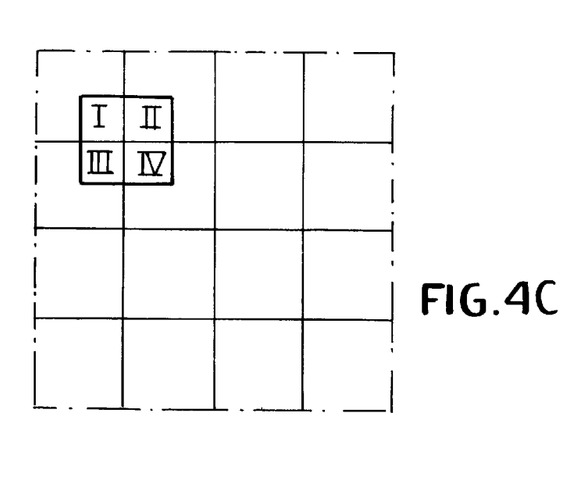
Figure 4D:
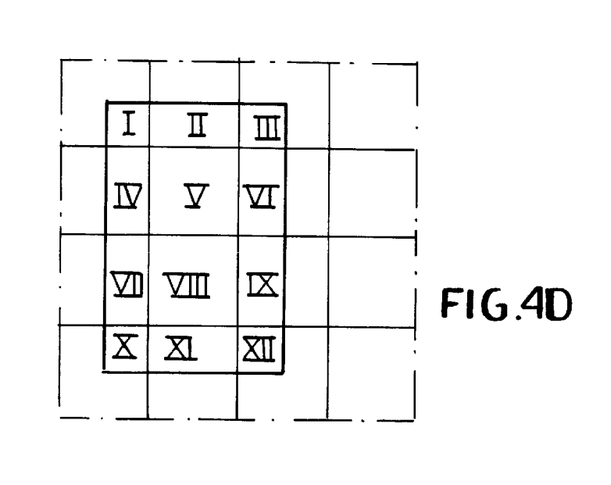

The way in which memory SD is organized holds no particular interest for the purposes of the present invention. To make the description clearer, where necessary reference shall be made to an example in which data in SD are arranged by macro-blocks and a row is assigned to each macro-block. Depending on the function circuit MSM has to perform, two writing modes (raster and macro-block) and four reading modes (raster, macro-block reading and extraction, zone extraction) will be possible. FIGS. 4A . . . 4D depict a picture portion subjected respectively to raster writing/reading, macro-block writing/reading, macro-block extraction, zone extraction. It should be stressed that the portion involved (bounded by the thicker lines in FIGS. 4B–4D) is in any case read sequentially row by row. In case of macro-block and zone extraction (FIGS. 4C, 4D) where the picture portion to be read extends over different stored macro-blocks, the term "quadrant" shall be used for the set of pixels to be extracted from each of these macro-blocks.

Going back to FIG. 3, the inputs to MSM comprise:
- a connection or bus 6 (picture bus) which carries the actual data to be written into the external memory or to be transferred to the output after macro-block/block format conversion or vice versa; bus 6 is advantageously a 10-bit bus, since as previously stated the device can be used immediately upstream or downstream of the transform (anti-transform) computation circuits which require 10 significant bits;
- a connection or bus 7 which carries the data synchronism signals;
- a connection or bus 8 (information bus) which carries the parameters required for processing incoming and outgoing samples when device MSM operates in macro-block mode; the parameters of interest shall be examined in the detailed description of the structure of device MSM; and
- a connection or bus 9 for synchronism signals concerning parameter extraction from bus 8.

The organization of the information on bus 8 and of the related synchronism signals on bus 9 is described in patent application PCT/GB 95 01433.

MSM outputs are: two connections 10, 11 for data (8-bit connections) and a connection 12 for synchronism signals. The two connections for the outgoing data are necessary in the case of zone extraction, to allow emission of all data in the available time, and in the case of 10-bit output: in that case one of the connections carries the eight least significant bits and the other one the two most significant bits.

With regard to synchronism, by way of non-limiting example reference will be made to a clock frequency of 18 MHz on the picture bus and on the information bus, and to a frequency of 36 MHz for reading/writing in SD. The main synchronism signals of interest for an understanding of the invention are: the picture synchronism signal (whose period is equal to the duration of the 36×45 or 30×45 macro-blocks) and the macro-block synchronism signal (whose period is equal to 420 pulses of the 18 MHz clock signal) when the circuit operates in macro-block mode; the frame synchronism and line synchronism signals when input or output signals are in raster format. Valid data signals are also provided.

It should be stressed that, in the macro-block time, the data of a macro-block are to be written in SD, whereas data of two macro-blocks must be read in certain operating modes. To allow this, the macro-block period is divided into three parts. The first part, whose duration is about 100 pulses of the 18 MHz clock signal, is destined for writing, while the other two parts, identical to each for other, are destined each to reading a macro-block. That partition of the macro-block time is shown in FIG. 7B, where the writing and reading intervals are denoted WR and RD, respectively. The longer time interval assigned to reading a macro-block stems from the greater complexity of reading operations, as it will be better explained hereinafter.

Figure 5:
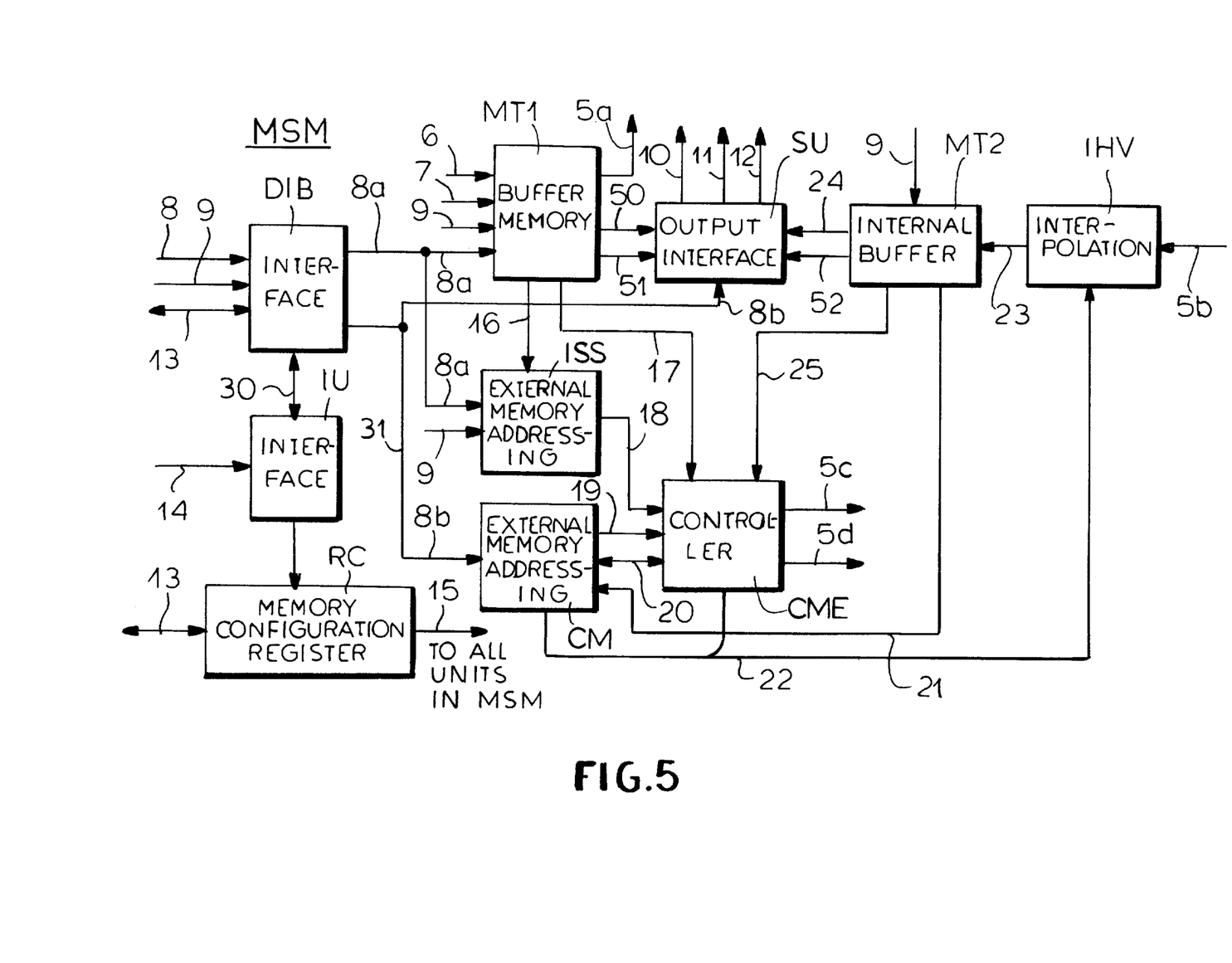
FIG. 5 is a block diagram of the device according to the invention.

FIG. 5 shows that in circuit MSM connections 6, 7 lead to a first internal buffer memory, schematically represented with its control units by block MT1. Outputs from MT1 comprise a connection 5a (belonging to line 5 shown in FIG. 3), which carries data and some control signals, to be seen further on, to external memory SD, and a pair of connections 50, 51 which, when the device operates without using the external memory, supplies an output interface SU with the data and synchronism signals to be transferred on connections 10–12.

Connections 8 and 9, on the other hand, lead to a decoder DIB which, at the appropriate instants, extracts parameters of interest for the specific application from the stream present on the information bus and feeds them to MT1 and/or to units ISS, CM. The latter units, in certain applications of the device and in co-operation with a controller CME of the external memory, provide for external memory addressing during writing (ISS) or reading (CM) and for motion compensation (CM).

Data read from the external memory are received by device MSM through a bus 5b (which also belongs to line 5 shown in FIG. 3) which leads to an interpolation unit IHV. That unit sends the data to a second internal buffer memory, schematically represented with its control units by block MT2, and then to output interface SU.

Circuit MSM also comprises a conventional microprocessor interface IU, which allows connection with an external controller, not shown, which provides for controlling, supervising and setting up the functions to be performed. Control of communication between circuit MSM and the external controller occurs by means of signals present on a connection 14. Interface IU is also associated with a configuration register RC, which is written by the external controller through a connection 13 and provides all remaining units of the device, through bus 15, with information concerning the function to be performed.

Instead of receiving the parameters of interest from information bus 8, device MSM could receive such parameters from the external controller, through connection 13 which also leads to unit DIB, to allow that kind of operation. In any case, it is the task of the external controller to provide the parameters required for information reception/emission in raster format. The loading of the parameters provided by the external controller into DIB is controlled by IU, through connection 30.

The device according to the invention could also be an autonomous device, which does not employ an external controller. In that case connection 14 is wired so that signals present on it have a pre-set configuration, not used for the signals generated by the controller. Connection 13 also is wired so that signals on it represent appropriate configuration parameters. Interface IU, when it recognizes the special configuration on connection 14, will cause, through connection 31, information wired on connection 13 to be loaded into RC.

For the sake of simplicity, FIG. 5 and the more detailed Figures which follow do not show clock signals, reset signals and in general all those signals which are not necessary for an understanding of the invention. Note that the synchronization of operations performed by the various units of the device is handled in a distributed fashion, by appropriate time counters present in the units themselves.

The functions performed by the various units of MSM shall now be examined in greater detail.

Buffer memory MT1 comprises two elements in ping-pong arrangement, alternating in writing and reading operations at macro-block frequency. The elements are structured in such a way as to store pixel pairs. During the reading phase, blocks of 8 pixel pairs will be transferred to the external memory or to the output. The structure of MT1 shall be described in greater detail with reference to FIGS. 6A and 6B.

Unit DIB receives the parameters according to which data incoming to device MSM (writing) and respectively data outgoing from the device (reading), are to be processed, and extracts them according to the synchronism signals present on connection 9. The parameters are organised in nibbles (half-bytes) arranged in a pre-set order in the stream, so that their meaning can immediately be deduced from the order in which they reach DIB. Unit DIB therefore essentially comprises a nibble counter and two groups of registers, to store the parameters for processing incoming and outgoing data respectively. Each register group in turn comprises two sets of registers which make available to downstream units the whole of the information concerning the current picture and respectively the information concerning the current macro-block.

In particular, in the writing phase, circuit DIB must extract, at picture frequency, information about the type of encoded picture (I, P, B); picture structure ("frame" or "field" and, in the tatter case, lower or upper field); and the external memory element and position, inside the element, where the picture is to be written.

Information at macro-block frequency of interest for writing is the type of transform and, for macro-block/block conversion and vice versa, the block format (progressive/interlaced).

For reading, the information required at picture frequency is the same as for writing. At macro-block frequency, on the other hand, DIB extracts motion compensation parameters, in particular:

compensation type (forward, backward, both or neither);
prediction mode: more specifically, for a "frame" type of picture, prediction can be: "frame", concerning the complete macro-block and requiring a single motion vector; "field", pertaining to the two fields separately and requiring two motion vectors; "dual prime", consisting of a double field prediction and of a crossed combination (lower-upper fields) of the two predictions to yield the predicted macro-block, and requiring four motion vectors. For the field picture, prediction can be: "field" (wholly analogous to the "frame" prediction mentioned above); 16×8, which concerns the upper or lower half of a macro-block and requires two motion vectors; "dual prime", consisting of a double field prediction and of a combination of the results and also requiring two motion vectors;
the vertical selection of the field, which indicates which field the motion vector is to be applied to; and
motion vectors.

Unit ISS is a finite state machine which, when data need to be written in macro-block format in SD, generates writing addresses for SD according to the parameters provided by decoder DIB (wires 8a) and to signals MBC, MBS which are provided by MT1 through connection 16 and represent the co-ordinates of a column and of a stripe of macro-blocks in the picture. Addresses are sent to CME through connection 18. Clearly, the address generation law depends on the data arrangement in SD. Knowing that arrangement, the person skilled in the art would have no problem in designing logic network ISS.

Unit CM generates and sends to external memory controller CME address signals and commands for reading in SD (FIG. 3) in one of the three macro-block format reading modes (macro-block reading and extraction, zone extraction). For that purpose CM receives reading parameters from DIB, through wires 8b; moreover, through a connection 20, CM will exchange a certain number of signals with CME and, through a connection 21, it receives timing signals from MT2. Note that when data arrive at or have to be emitted from MSM in raster format, circuit CM does not intervene and CME is entirely tasked with addressing. The structure of CM is shown in greater detail in FIG. 7.

Controller CME is tasked with driving the external memory addressing and control signals, presented respectively on connections 5c, 5d, in the different writing and reading modes described above. In case of raster writing/reading, CME generates the addresses autonomously, whilst in the other cases it receives the addresses from ISS, CM. The structure of CME shall be described in greater detail with reference to FIG. 8.

Buffer memory MT2 comprises two pairs of elements in ping-pong arrangement, alternating in writing and reading operations at macro-block frequency. A pair of elements is needed to store data read from SD (FIG. 3), in place of a single element as in MT1, as certain motion prediction and compensation modes require a combination of pixels of picture pairs to be performed and, in zone extraction, pixels from two zones are to be emitted. Data to be written arrive in pairs from interpolator IHV and are written sequentially (in frame or field mode). Writing and reading are progressive, in frame or field mode. Reading is slaved, in terms of timing, to reading from SD (FIG. 3). if both elements in a pair are to be used, they are written one after the other and read concurrently.

Given these indications, designing MT2 does not present any problems to the skilled worker in the art.

Pixels are transferred from unit MAT2 to output interface SU together with valid data signals, present on a wire 52. SU performs any required pixel combination or emits the data as they are read, if no combination is required; moreover it associates the data with the synchronism and valid data signals necessary in order the utilisation devices can recover the data correctly. With regard to valid data signals, either the ones provided by MT1 on a wire 51 or the ones provided by MT2 on a wire 52 shall be used, depending on the applications of device MSM. SU is described in greater detail with reference to FIG. 9.

Unit IHV is to create a new macro-block whose pixels are the average between adjacent pixels in the macro-block read from SD (interpolation). Information needed to perform that function is represented by signals H_NT, V_INT which, when active, request interpolation along the horizontal and the vertical axis, respectively, of the macro-block. Those signals are provided through connection 22 by motion compensation unit CM, depending on the content of the motion vector, whose resolution is half pixel. Processed data are transferred to unit MT2 through a connection 23. Unit IHV comprises a control state machine and an operating unit. The first one operates on the basis of signals H_INT, V_INT and of an additional signal FS_BYTE, also generated by CM, which indicates whether, for each pixel pair, the first pixel is to be processed or discarded. The operating unit, instead, is tasked with computing the required averages (hence performing additions and divisions). Unit IHV is transparent to data if device MSM is used for conversion into raster format; if circuit MSM is used for zone extraction, unit IHV only discards the first pixel, if necessary.

Figure 6A:
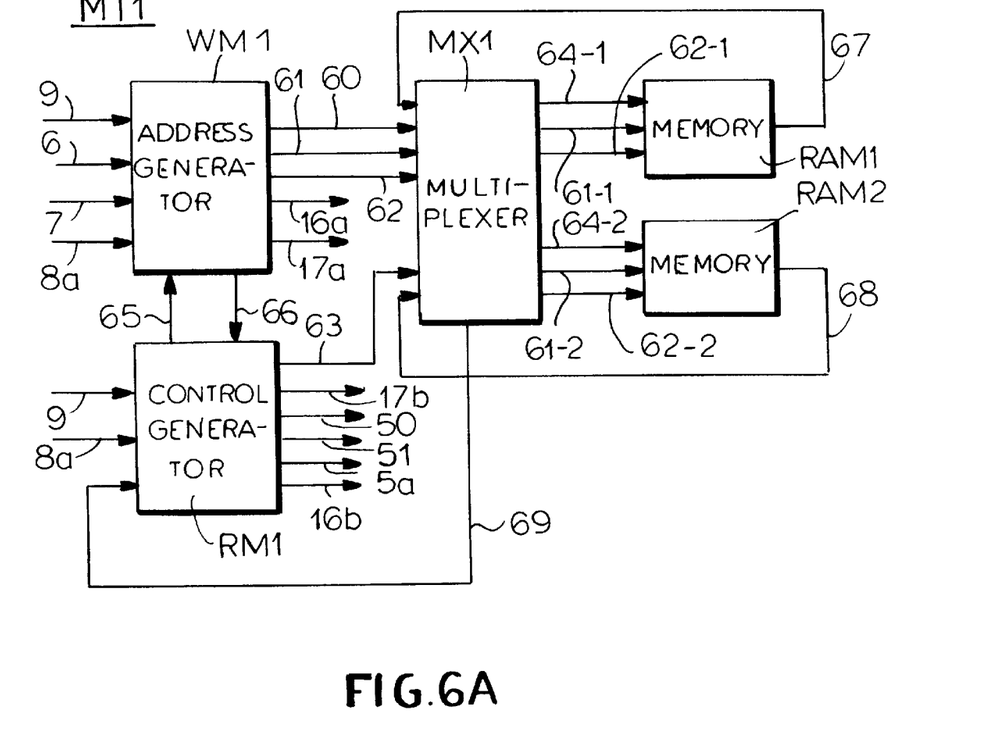

In FIG. 6A, RAM1, RAM2 indicate the two elements of the first buffer memory MT1. Such elements receive addressing and control signals for writing and reading respectively from two finite state machines WM1, RM1, by means of a multiplexer MX1. Through MX1, the memory element which is being written receives from WM1 also the data arriving at MSM (FIG. 3) through bus 6, and the element which is being read transfers the data read to RM1 which forwards them on bus 5a or 50. WM1 sends to multiplexer MX1 addresses and data (through connections 60, 61), signals WE1, WE2 enabling writing/reading into/from either element, and signals ME1, ME2 timing the loading of an address or a datum into the memory. The outputs of WM1 on which these control signals are present are represented schematically in the whole by connection 62. The sequence of emission of writing commands, addresses and data is the sequence typical for any memory and therefore a more detailed description is not required. RM1 instead generates reading addresses, sent to MX1 through a connection 63.

Outputs 61-i, 62-i, 64-i (i=1,2) from MX1 indicate the connections transferring to RAM1 and RAM2 the data to be written, the control signals and the addresses present on connections 60, 63: clearly, at each macro-block cycle the connections between inputs 60, 63 and outputs 61-1, 62-1, 64-1 and 61-2, 62-2, 64-2 will be reversed.

Outputs 67, 68 of RAM1, RAM2 (which are 20-bit bus, since data transfer towards the external memory involves a pixel pair each time) are brought back to the inputs of multiplexer MX1 which, depending on which of the two memories is being read, connects output 67 or 68 to data output connection 69 (also at 20 bits). This connection leads to an input of RM1 which, for the applications entailing the use of the external memory, converts the output format from 20 to 16 bits and emits the data on a first group of wires of connection 5a. If the circuit application does not require access to the external memory, RM1 presents the data on bus 50 at 10 bit for transfer to SU (which transfer therefore occurs again by individual pixels, and not in pairs) and generates, on connection 51, synchronism signals for outgoing data (in particular, a valid data signal.

Figure 6B:
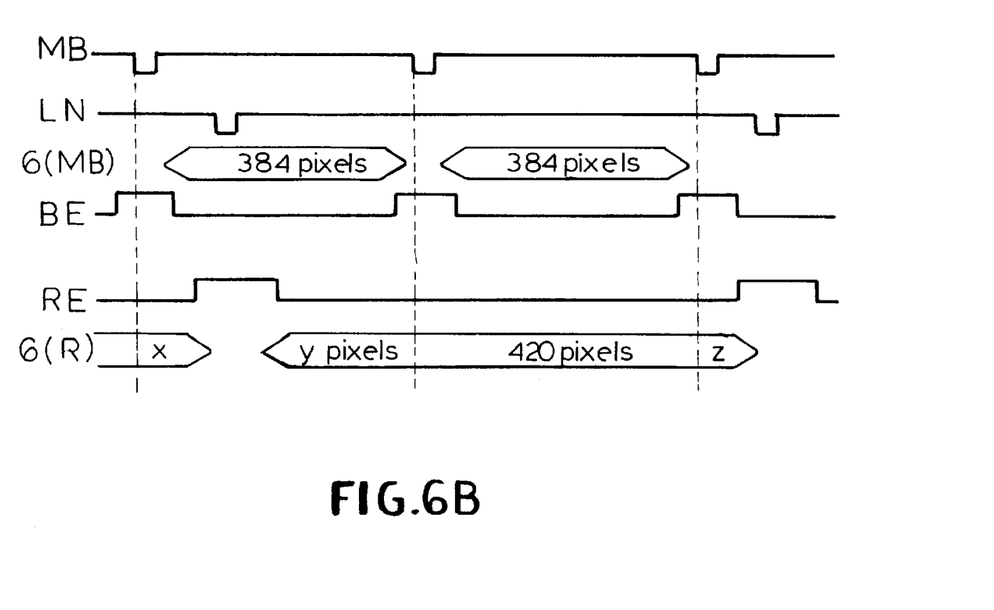

Logic network WM1 makes pixels to be written into RAM1, RAM2 in the order they arrive and, as stated above, it provides RAM1 or RAM2 with two pixels at a time. When data incoming over connection 6 are in block or macro-block format, during the macro-block time WM1 must command writing of 384 pixels (256 for luminance and 128 for chrominance) into RAM1 or RAM2, whilst in case of data in raster format the number of pixels to be written varies from a minimum value to 420, depending on the relative position of the line synchronism signals and of the blanking periods (during which no valid data are present) with respect to the macro-block period, as can be seen in FIG. 6B. There, MB, LN indicate respectively the macro-block and line synchronism signal, BE, RE indicate valid data signals (for macro-block and raster format, respectively) and 6(MB) and 6(R) indicate the data present on bus 6 in the two cases. Note that the data are assumed to be valid when signals BE, RE are at low logic level. As can be seen, in the case of raster format, during the first macro-block period shown, x+y pixels of two different lines will be written into the memory, given the presence of a blanking period (RE at high logic level), whilst during the second period 420 pixels of a same line will be written; there is again a blanking interval during the third macro-block period, and therefore z pixels of a line and a certain number of pixels of another line will be written. This shall have to be taken into account in the course of reading, as will be better seen further on.

For its operation, WM1 needs the following signals:

a master clock signal which is represented by the macro-block synchronism signal present on connection 9;

picture and macro-block synchronism signals WP, WMB and a valid data signal WBE (in case of input in macro-block or block format), or alternatively, in case of raster scan operation, field and line synchronism signals F, LN and a respective valid data signal RE; these signals are present on connection 7; for raster operation, WM1 is also provided with a signal FST_FIELD (derived for instance from the parameters read by DIB, FIG. 5) which indicates that the incoming field is the first or second one and which is used by a line counter (within WM1) to determine the initial count value;

the parameter indicating upper or lower field, provided by decoder DIB through wires 8a; and a signal (STILL_READING) indicating that reading is in progress provided by RM1 through a wire 65 to prevent the unwanted switching between the functions of RAM1, RAM2.

In addition to the signals already seen, WM1 emits:

on wires 17a of connection 17, value CNT_LN of the line number count, destined to external memory controller CME which uses it for addressing in case of raster writing; and on a group of wires 66 connected to RM1 a signal RD indicating the beginning of the writing operation (regardless of the operation mode) and allowing logic network RM1 to be set up for subsequent reading; in case of raster operation, the pixel count (NWRITE), the pixel-per-line count (NWRITE_LN) and the line change signal (LN). This information is required in order to take into account some particular situations, which will be seen in connection with RM1.

In correspondence with the macro-block synchronism pulse, WM1 also extracts from the data stream information which precedes the pixels of the picture, in particular:

a picture structure indication, which can have a particular configuration that indicates whether the data which follow refer to a repeated field ("dormant field"). Field repetition is necessary in order to transfer data correctly from a system operating at 50 Hz to one operating at 60 Hz or vice versa. In correspondence with that information, writing into the memory is disabled; and word pair MBC and MBS, which are transferred to CM through wires 16a of connection 16 and which are present only in case of operation in macro-block format.

Logic network RM1 has to control a sequential reading from RAM1 or RAM2 if the data are to be sent to the external memory, since in that case it is up to ISS and/or CME (FIG. 5) to provide the appropriate addressing; if on the contrary the data are to be transferred to output bus or buses 10, 11, reading takes place in a manner depending on the required format.

RM1 must receive, in addition to the master clock signal and to the signals coming from WM1, the picture synchronism signal for reading and, for format conversion from macro-block to block or vice versa, the parameter that indicates the type of block. This information is provided by DIB (FIG. 5) through wires 8a. RM1 provides CME, through wires 17b of connection 17, with a signal EN_WR enabling writing into the external memory and, in case of raster operation, with a start line signal (START_LINE). Moreover, in case of macro-block format, RM1 provides ISS, through wires 16b of connection 16, with a signal NRAS requesting generation of a new row address for the external memory.

If the signals on bus 6 are in raster format, data transfer from RAM1 or RAM2 to the external memory requires some expedients. As said, the external memory must receive groups of 8 pixel pairs (i.e. the equivalent of one row of a macro-block), and hence 8 pixel pairs are to be read each time from RAM1 or RAM2. However, as has been seen in FIG. 6B, the macro-block synchronism signal could arrive while the data of a same line are being written into RAM1 or RAM2. Thus, the consequent switching of the buffer element involved in writing may take place before the loading of a group of 8 pixel pairs has been completed. Moreover, the overall number of pixel pairs loaded might not be a multiple of 8. Therefore it may happen that data which are to be written at a same address of the external memory or which are involved in a same transfer operation towards that memory, are to be read in part from RAM1 and in part from RAM2. The 8 pixel pairs read from RAM1 or RAM2 during a certain phase can therefore contain some nonsignificant data. Under these conditions logic network RM1 generates a signal DMQ, that is sent directly to SD through additional wires of connection 5a to mask the nonsignificant data. Additionally, data belonging to two different lines may have been written in a same element, and this also needs to be signalled to the external memory. This is the purpose of the START_LINE signal.

Figure 7A:
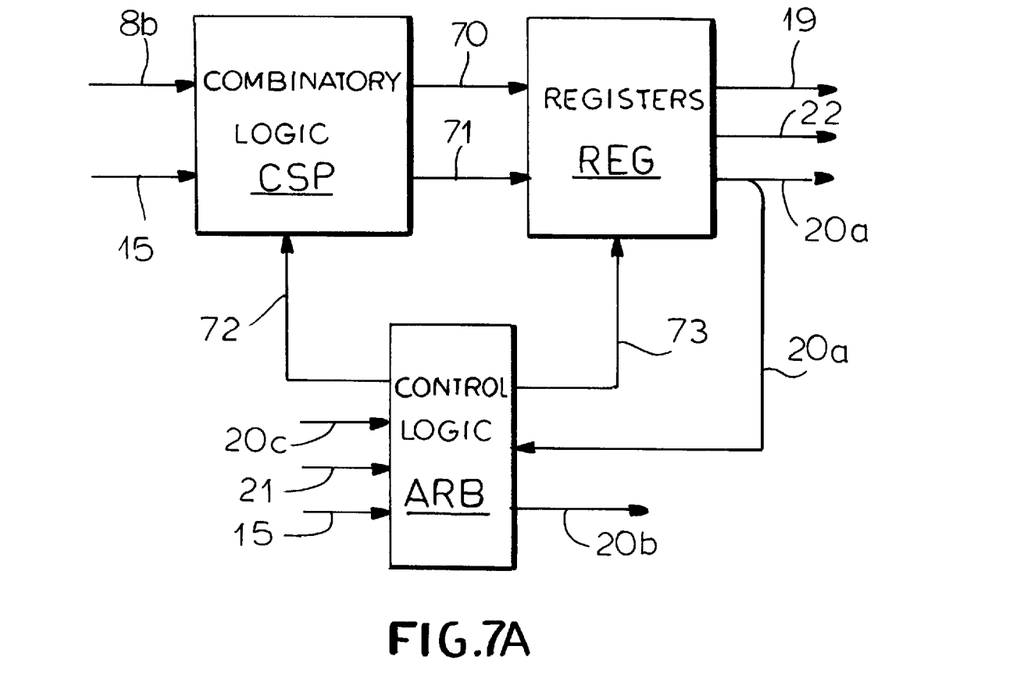
Figure 7B:
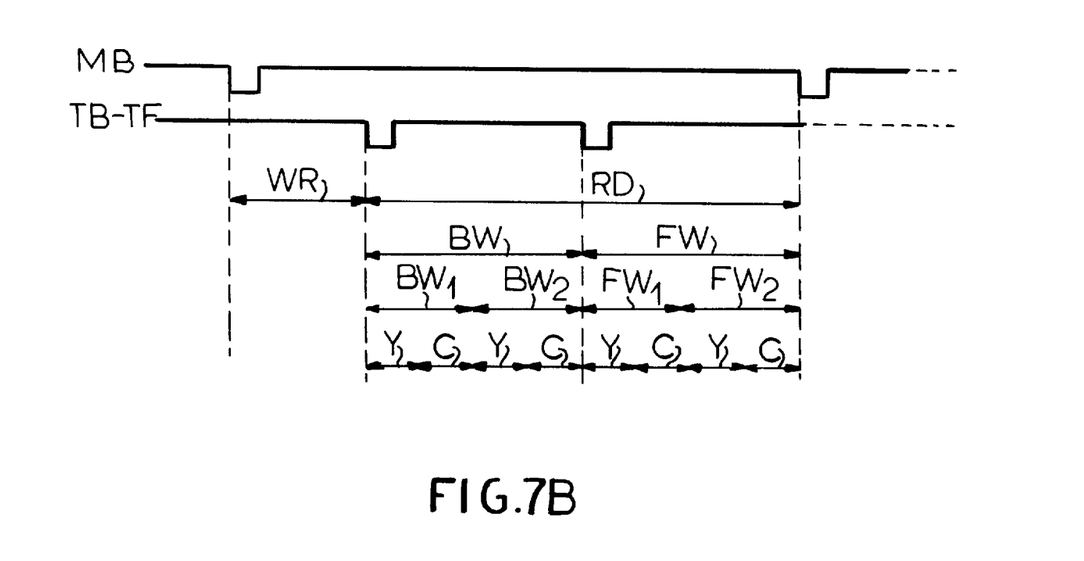

As can be seen in FIG. 7A, unit CM comprises: a combinatory logic network CSP computing the initial address of the macro-block or zone to be read or extracted; a bank of registers REG for temporarily storing and processing the initial address; and a control logic network ARB.

Combinatory network CSP computes and sends to registers REG, through connections 70, 71, the row and column addresses of the first pixel of a macro-block of the reference picture stored in SD, by applying if necessary one or more motion vectors, depending on the function required of device MSM (which function is indicated by the configuration signals present on connection 15). For that purpose CSP will receive the appropriate parameters from DIB (FIG. 5) through connection 8b and will receive from logic network ARB, through a connection 72, information on the involved vector and on whether the pixels to be extracted are chrominance or luminance pixels. On that regard, it is reminded that in case of macro-block extraction, depending on the motion compensation and prediction modes, it may be necessary to extract data of two macro-blocks and to apply two motion vectors to each macro-block, both for luminance and for chrominance. Therefore, for a single reading from SD (FIG. 3), CSP may have to compute eight initial addresses. This situation is shown in FIG. 7B, which shows the time arrangement of reading operation in SD (interval RD) in case of bi-directional compensation. MB is the macro-block synchronism signal, TB_TF is a signal identifying the beginning instants of the two reading operations of each macro-block cycle, BW and FW indicate the periods destined to reading the future and the past reference pictures, respectively, BWi and TWi (i=1, 2) indicate the application of the two motion vectors and Y, C indicate the reading of luminance and chrominance pixels, respectively. The initial address therefore must be computed for every Y and every C.

Register bank REG comprises a number of registers linked with the maximum number of quadrants in the picture portion to be read (thus up to 12 quadrants, as it can be required for zone extraction). The involved register, selected by ARB through a signal LOAD, loads the row and column address provided by CSP and increments the column address while reading the pixels of a quadrant, on command from logic network ARB (signal INCR_COL). On command from ARB (signal COL_ROW, which selects the register from which the address is to be taken) the updated address is presented on a connection 19 for transfer to CME.

REG also generates, on connection 22, the signals required for the operation of interpolation unit IHV (signals H_INT, V_INT, FS_BYTE already examined) and signals necessary for the operation of CME. The latter are essentially:

a signal RDCOUNT which, in case of macro-block or zone extraction, indicates how many pixel pairs are to be read from the first quadrant to be extracted. That information clearly enables controller CME to obtain information on the number of pixels of the other quadrants;

a signal NLINES which, again in case of macro-block or zone extraction, communicates to CME the number of lines to be read within a quadrant; the value of NLINES is progressively updated by ARB (signal DECR_NLINES) as a line is read; depending on reading progress, ARB can provide CSP with the information about the motion vector and the chrominance/luminance alternation; and signal FS_BYTE, already discussed.

Logic ARB generates signals LOAD, INCR_COL, COL_ROW described above by exploiting, in addition to configuration information, also signal TB_TF, which is supplied by MT2 through a connection 21, and the requests for new addresses RAS_REQ and CAS_REQ coming from CME (wires 20c). ARB also generates the read-enable signal EN_RD and an additional signal LAST_ADD which is active in case of macro-block extraction and communicates that the first two quadrants have been read. These two signals are sent to CME (wires 20b).

Figure 8:
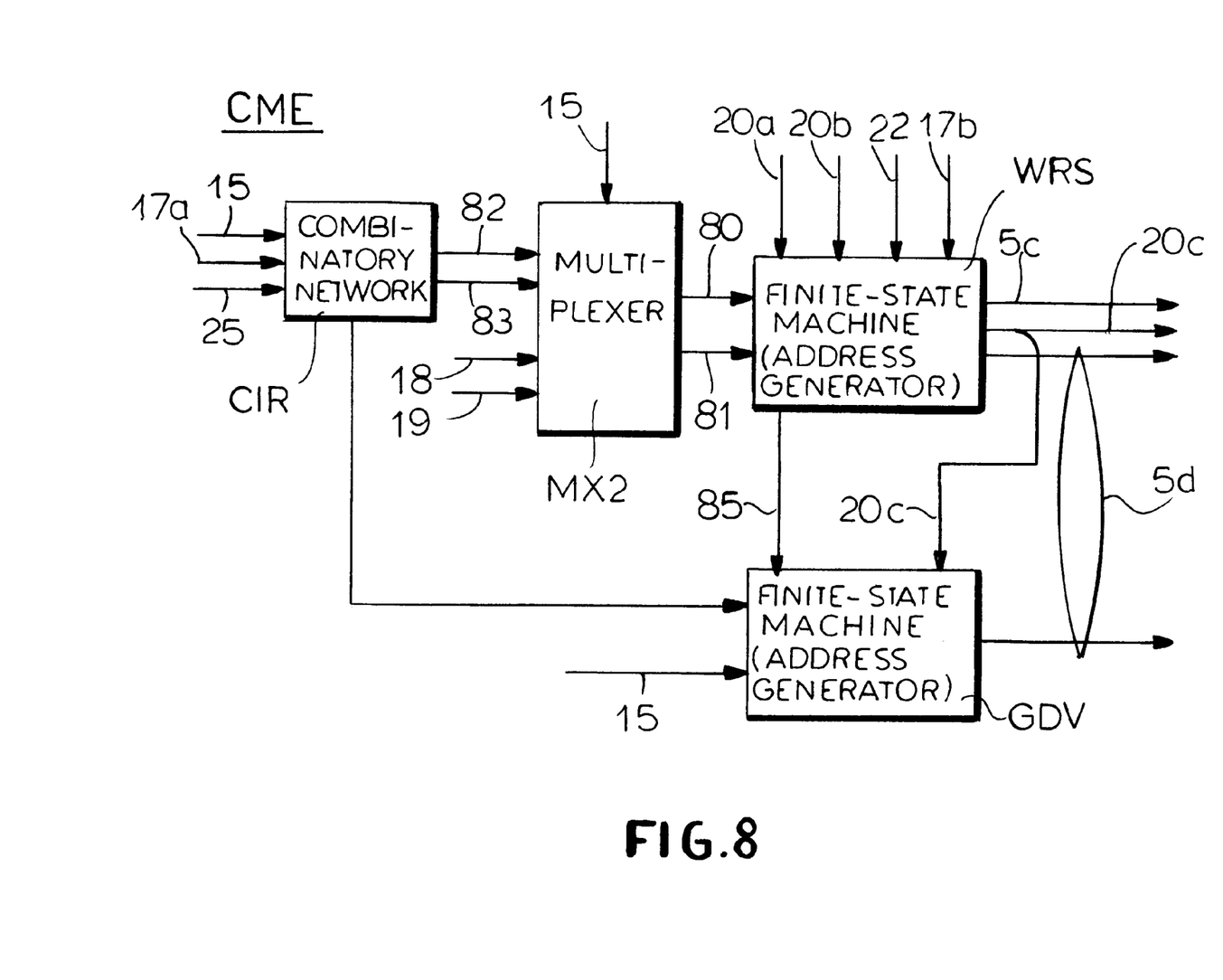

As can be seen in FIG. 8, controller CME comprises
a first finite state machine WRS, destined to provide SD (FIG. 3) with addresses and commands for reading and writing operations;
a second finite state machine GDV, destined to generate a signal DQ_VALID indicating a significant data in the reading phase (thus, a signal analogous to signal DMQ generated by RM1, FIG. 6); and
a combinatory network CIR for computing addresses for SD in case of raster writing/reading.

A multiplexing system MX2, depending on the functions the device is to carry out, transfers on connections 80, 81 connected to WRS either the writing and reading addresses emitted by CIR on outputs 82, 83, or those generated by ISS or CM (FIG. 5) and present on connections 18, 19.

For its operation, logic network WRS receives the write-enable or read-enable signals EN_WR, EN_RD from MT1 or CM (FIG. 5), and receives from CIR a pair of configuration signals (MB_RASTER, ZONE) whose combination allows programming the different modes for accessing SD for writing or reading. In case of zone extraction, WRS also receives an additional configuration signal bearing the zone size information (SIZE). That information is also provided to GDV. The signals commanding evolution of the operation of CME for the different operating modes shall be seen below.

Combinatory logic CIR essentially performs the same functions as blocks CSP and REG shown in FIG. 7. CIR computes, separately for chrominance and luminance, the row and column address for SD (FIG. 3) where the first pixel of a given line is to be written or read. That computation is performed on the basis of line number count CNT_LN, provided by block WM1 (FIG. 6) through wires 17a, and of an even/odd line indication derived from that count. For its operations, CIR also receives a synchronism signal FOUT, provided by control units in MT2 (FIG. 5) through wire 25 and indicating whether the pixel belongs to the first or the second field, and signal START_LINE, which signals the line change. The determination of the initial address and the subsequent updating take place according to an algorithm which takes into account how data are arranged in the external memory. Such algorithm is not of interest for the invention. In any case, for a given arrangement, the person skilled in the art has no problems in determining the address generation law.

For writing/reading a macro-block it is necessary to take into account that all pixels of a macro-block are stored in the same row in external memory SD. Therefore unit WRS for every 8 pixel pairs, will need only a new column address, which is requested from CM by means of a signal CAS_REQ (present on one of wires 19b).

For macro-block or zone extraction (see also FIGS. 4C, 4D), forming each row of the extracted macro-block or zone requires addressing a different macro-block at each passage from one quadrant to another; moreover, once one row has been completed, it is possible either to return to a macro-block previously addressed or to move on to a new macro-block. Under these conditions WRS shall also have to generate row address requests (RAS_REQ) towards CM (FIG. 5). SDRAM memories are programmable for rapid operation when that type of access is required. Advantageously, in case of macro-block extraction only the column address request is sent when the new row of the macro-block being extracted is formed with data of a quadrant read previously, whereas both the row and the column address requests are sent when moving to a new quadrant; in case of zone extraction, on the other hand, both addresses will be requested at each quadrant change, be it new or not. In order rapidly to prepare the new address requests, logic WRS receives from CM signals RDCOUNT and NLINES, already examined.

In that type of operation, WRS also sends to GDV, through a connection 85, signals (CNT_LEFT, CNT_CENTER, CNT_RIGHT for zone extraction, and CAS1, CAS2 for macro-block extraction) informing about the quadrant being read. On the basis of that information or of a valid data signal in raster reading (DO_RAST_VALID) provided by CIR through a connection 84, GDV sends masking signal DQ_VALID towards the external memory. This signal, in case of zone extraction, may be activated and de-activated when beginning and ending reading data of one row of the individual quadrants.

Figure 9:
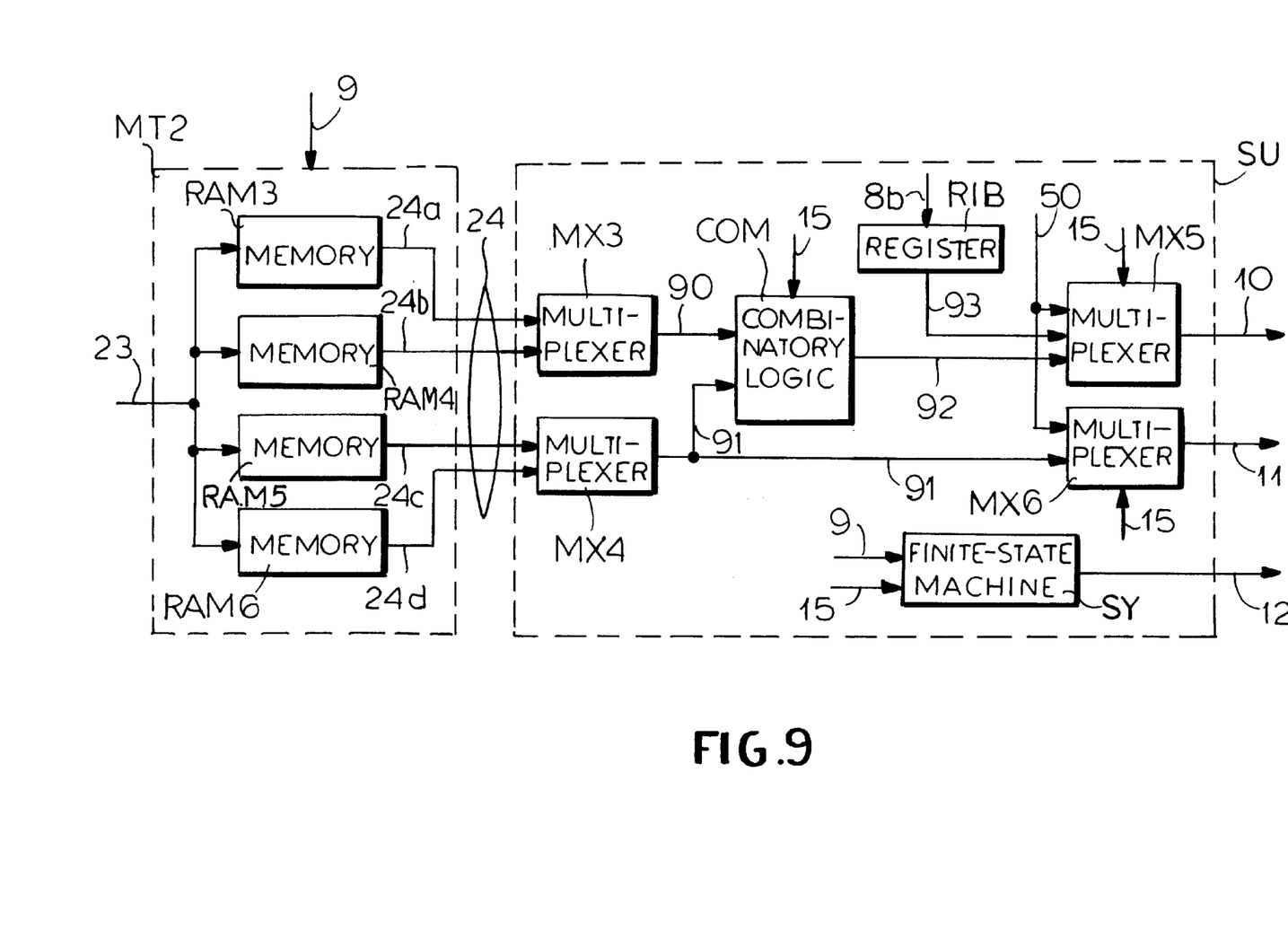

FIG. 9 represents output stage SU with its connections to the four memory elements RAM3–RAM6 of MT2. It is assumed that: if the operating mode entails writing in two memory elements within the macro-block time, the element pair involved in the operation comprises RAM3 and RAM5 or RAM4 and RAM6, respectively; if a single memory element is sufficient, RAM3 or RAM4 is used; if the data are to be transferred on a single output bus, bus 10 is used.

The output stage must provide:
a combination of the pixels stored in the two memory elements when a bidirectional motion compensation is performed;
the pixels read from a memory element, if the circuit has to emit data in raster format or if a macro-block reading was performed; and
on the two buses 10 and 11, the data read in parallel from the two memory elements in case of zone extraction or respectively the least significant byte and the two more significant bits of pixels requiring 10 bits.

For that purpose, outputs 24a, 24b and respectively 24c, 24d of RAM3–RAM6 are connected to the inputs of a pair of multiplexers MX3, MX4 which select the output of the element being read and serialise the two bytes read in the memory. Outputs 90, 91 of the two multiplexers are connected to a combinatory logic COM which, depending on the application, computes an arithmetic average, rounded off by excess, between homologous pixels read from the two memory elements, or lets data provided by MX3 pass unaltered. Output 92 of COM is connected to an additional multiplexer MX5 connecting bus 10 either to that output or to the wires of bus 50 on which are present the 8 least significant bits of the data coming from MT1. MX5 has an additional input 93 which, regardless of the application, allows transmitting, in correspondence with the macro-block synchronism signal, the 3 bytes of the macro-block label, i.e. the time stamp and the row and stripe indications MBC, MBS seen in connection with MT1. This label is obtained from the information provided by DIB through wires 8b and is presented at the output of a register RIB. Output 91 of MX4 is instead connected to a multiplexer MX6 which, depending on the application, connects bus 11 either to output 91 of MX4 or to the wires of bus 50 on which the two most significant bits of the data coming from MT1 are present.

An additional multiplexer, not shown, emits (e.g. on bus 10) either of the valid data signals described previously.

Figure 10A:
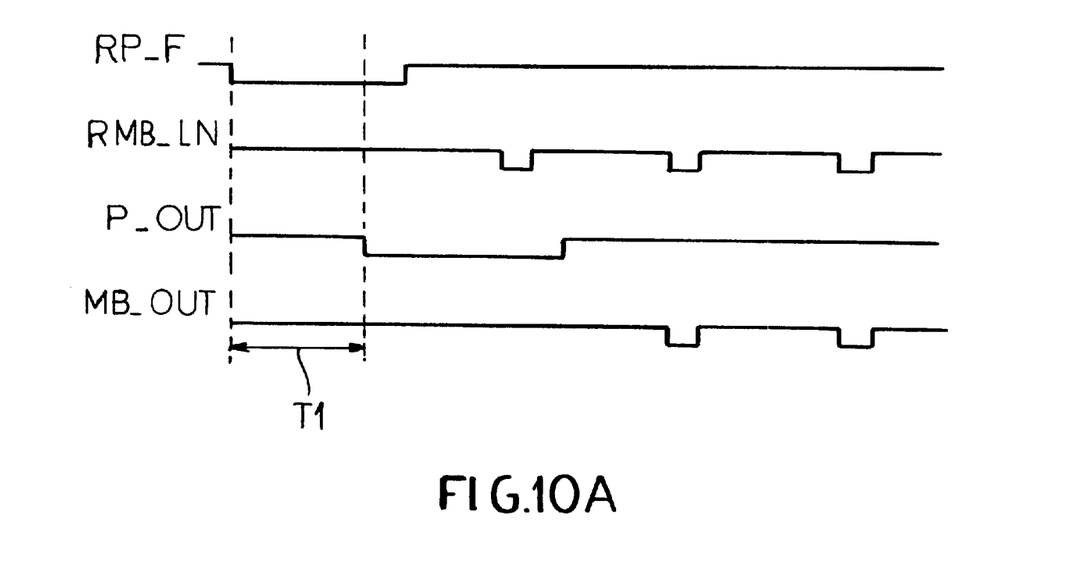
FIGS. 10A and 10B are diagrams showing some synchronism signals concerning the output interface.
Figure 10B:
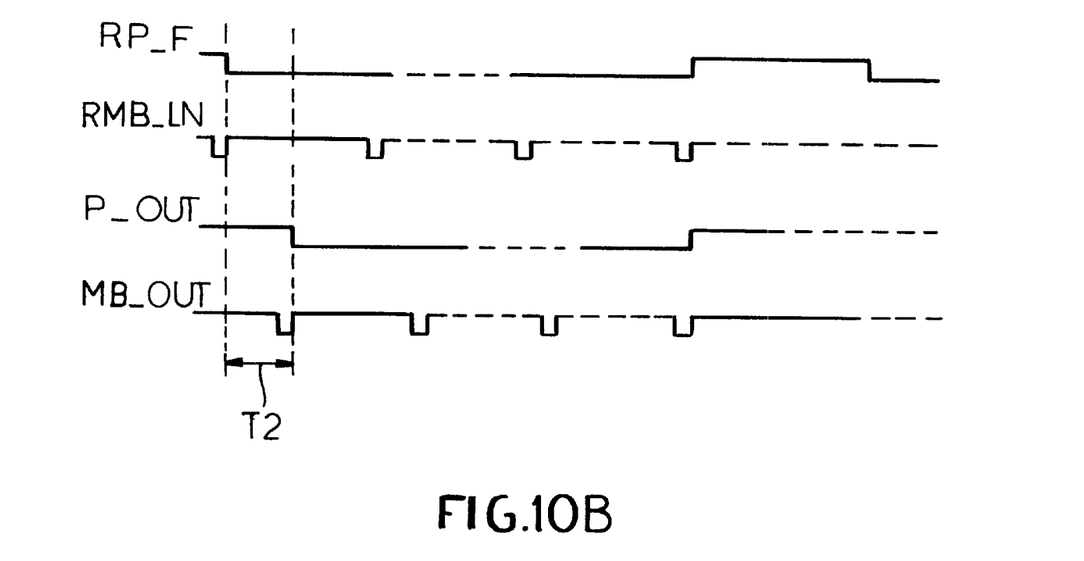

Output interface SU also comprises a finite state machine SY for managing synchronism signals in the phases in which the device reads data from SD (FIG. 3). SY is essentially tasked with re-transmitting towards the outside, with a suitable delay, a pair of synchronism signals RP_F, RMB_LN for the reading phase, which it receives through bus 9. These two signals have a different meaning and differently handled depending on whether the device has to emit signals in macro-block or raster scan format. In the first case, the two signals represent the picture and the macro-block synchronism respectively, and are delayed by a first fixed time, which in the preferred embodiment essentially corresponds to the duration of one macro-block (or more exactly to 421 pulses of the 18 MHz clock signal, i.e. one pulse more than that duration). In the second case these signals represent the field and the line synchronism respectively (the latter with a period of 1152 or 1144 clock pulses, depending on power supply), and are delayed by a second time which depends on the relative position between field synchronism signal RP_F and the master clock signal. That second time varies, in the preferred embodiment, between the 421 pulses of the 18 MHz clock signal and a time corresponding to the duration of two macro-blocks. Obviously, SY shall also have to receive information about the functions the device must perform (and thus about the required output format), present on connection 15. For a better understanding, FIGS. 10A and 10B depict the trend of signals RP_F, RMB_LN and of the corresponding output signals P_OUT, MB_OUT for the macro-block and raster scan output format respectively. T1, T2 indicate the two delays. The person skilled in the art has no problems in providing a state machine performing the aforesaid functions.

We claim:

1. A multi-function device for manipulating video sequences relating to digitized pictures comprising luminance and chrominance pixels organized in blocks of N×N pixels and in macro-blocks comprising a predetermined number of luminance and chrominance pixel blocks, the device being selectively configurable to perform one of a plurality of functions required by a system for the transmission and reception of compressed video sequences, said device comprising in a single integrated circuit:

a first memory system for temporarily storing and formatting the sequences to be manipulated before forwarding them to an external memory, the function of the device is to perform requiring use of said external memory, or to an output of the device;

a second memory system for temporarily storing and formatting sequences read from the external memory, before forwarding them to the output of the device;

addressing means for controlling the transferring of video sequences from the device to the external memory and from the external memory to the device, said addressing means comprising a first and a second unit for generating addresses when the video sequences are written into and read from the external memory in a first writing and reading mode and a third unit which transfers to the external memory either the addresses generated by said first and second unit or addresses generated internally of said third addressing unit depending on whether the video sequences are written into and read from the external memory in said first writing and reading mode or in a second writing and reading mode;

processing means for processing video sequences read from the external memory, said processing means being selectively enabled to perform a pixel interpolation on a macro-block or to let pass pixels unchanged depending on the function of the device and which the device is enabled to perform, and transferring the interpolated pixels or the pixels read from the external memory to said second memory system;

means for receiving, decoding and sending to said first and second memory systems and to said addressing means of the device parameters containing information about the manipulations to be performed on the video sequences;

an output interface, which receives pixels to be emitted on the output of the device from the first or the second memory system and emits either the pixels read or a combination thereof depending on the particular function to be performed; and configuration means for supplying the first and the second memory system, the addressing means, the means for receiving, decoding and sending parameters and the output interface with configuration signals in order to selectively set it to operate in one of a plurality of operating modes, each corresponding to one of said different functions.

2. The device defined in claim 1 wherein the configuration means are arranged to selectively enable the device to perform the functions of:

a device for reordering sequences from an acquisition order to an encoding order at the transmission side or, vice versa, from an encoding order to a display order at the reception side, by using the external memory, such reordering requiring a conversion from a raster scan format to a macro-block scan format or vice versa, and possibly a conversion between two different raster scan formats;

a device for scan format conversion from a macro-block scan format to a block scan format or vice versa, upstream of circuits computing a two-dimensional transform or downstream of circuits computing an inverse transform, such conversion using the first memory system alone; and a prediction device for generating predicted pictures, possibly with motion compensation, starting from one or more reference pictures stored in the external memory, the generation of predicted picture requiring extracting, from the external memory, macro-blocks to which motion vectors may be applied, with regard to both luminance pixels and chrominance pixels, or extracting sets of luminance or chrominance pixels of pre-defined size, larger than that of a macro-block.

3. The device defined in claim 1 wherein the means for receiving, decoding and sending parameters are connected to an information bus, independent of a picture bus, which provides the device with these parameters and synchronism signals for their acquisition when the device has to manipulate sequences arranged in macro-blocks.

4. The device defined in claim 3 wherein, to manipulate sequences in raster scan format, said parameters are provided to the means for receiving, decoding and sending parameters by an external controller, which controls, supervises and sets up the functions to be performed through the configuration means.

5. The device defined in claim 4 wherein said parameters are sent to the means for receiving, decoding and sending parameters by the external controller, regardless of the operating mode.

6. The device defined in claim 4 wherein the configuration means are arranged to set up autonomously the functions to be carried out, without intervention of an external controller, on the basis of a particular combination of configuration signals permanently wired at their input.

7. The device defined in claim 6 wherein said external memory is a synchronous dynamic random access memory comprising a plurality of memory units each capable of storing a plurality of pictures.

8. The device defined in claim 6, wherein said first and second addressing units are arranged to generate addresses for macro-block writing and reading into and from said external memory when the device operates in macro-block scan format said matrix-block writing and reading mode being said first writing and reading mode, the third addressing unit comprising address generation means for generating the addresses as required by writing or reading in a raster scan format which is said second writing and reading mode.

* * * * *